US007240078B2

(12) United States Patent
Cheng et al.

(10) Patent No.: US 7,240,078 B2
(45) Date of Patent: Jul. 3, 2007

(54) METHOD, SYSTEM, AND PROGRAM FOR QUERY OPTIMIZATION WITH ALGEBRAIC RULES

(75) Inventors: Qi Cheng, Markham (CA); Mir Hamid Pirahesh, San Jose, CA (US); Yang Sun, Morgan Hill, CA (US); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/721,802

(22) Filed: Nov. 25, 2003

(65) Prior Publication Data

US 2005/0114311 A1    May 26, 2005

(51) Int. Cl.
*G06F 17/30* (2006.01)
(52) U.S. Cl. .......................................... 707/203; 707/3
(58) Field of Classification Search .............. 707/1–10, 707/100–104.1, 200–205
See application file for complete search history.

(56) References Cited

U.S. PATENT DOCUMENTS

| | | | |
|---|---|---|---|
| 5,987,453 A | 11/1999 | Krishna et al. | |
| 6,032,144 A | 2/2000 | Srivastava et al. | |
| 6,449,605 B1 | 9/2002 | Witkowski | |
| 6,460,027 B1 | 10/2002 | Cochrane et al. | |
| 6,516,310 B2 | 2/2003 | Paulley | |
| 6,546,381 B1 | 4/2003 | Subramanian et al. | |
| 6,567,802 B1 | 5/2003 | Popa et al. | |
| 6,850,933 B2* | 2/2005 | Larson et al. ................... | 707/4 |
| 2002/0007385 A1 | 1/2002 | Stoutemyer | |
| 2002/0188600 A1 | 12/2002 | Lindsay et al. | |
| 2002/0198867 A1 | 12/2002 | Lohman et al. | |
| 2003/0018618 A1 | 1/2003 | Bestgen et al. | |
| 2003/0088558 A1 | 5/2003 | Zaharioudakis et al. | |
| 2003/0093407 A1 | 5/2003 | Cochrane et al. | |
| 2003/0093415 A1 | 5/2003 | Larson et al. | |
| 2005/0097072 A1 | 5/2005 | Brown et al. | |

OTHER PUBLICATIONS

Godfrey et al., "Exploiting Constraint-Like Data Characterizations in Query Optimization", 2001 ACM Sogmond International Conference on Management of data, pp. 582-592.*
U.S. Appl. No. 09/502,821, filed Feb. 11, 2000, entitled *"Optimizing Queries Using Automatic Summary Tables,"* invented by R.J. Cochrane, G.L. Lapis, T.Y. Leung, M. A. Paskin, M. H. Pirahesh, Y. Sun, M. S. Urata and M. Zaharioudakis.

(Continued)

*Primary Examiner*—Mohammad Ali
(74) *Attorney, Agent, or Firm*—Konrad Raynes & Victor LLP; Janaki K. Davda

(57) ABSTRACT

A query is matched to an outlier materialized query table that stores exception data. The query is searched for a source predicate. An outlier predicate in the outlier materialized query table that corresponds to the source predicate is searched for a target column that corresponds to a source column in the source predicate. A new range predicate is derived based on the target column and introduced into the query, wherein the query is executed to retrieve data from one or more data stores.

17 Claims, 7 Drawing Sheets

OTHER PUBLICATIONS

U.S. Appl. No. 09/412,033, filed on Oct. 4, 1999, entitled "*Schema Mapping System and Method*," invented by N. Subramanian and S. Venkataraman.

Zaharioudakis, M., R. Cochrane, G. Lapis, H. Pirahesh and M. Urata. "*Answering Complex SQL Queries Using Automatic Summary Tables.*" Proceeding of the 2000 ACM SIGMOD International Conference on the Management of Data, pp. 105-116, Dallas, Texas, 2000.

Rosenthal, A. and D. Reiner. "*Extending the Algebraic Framework of Query Processing to Handle Outerjoins.*" Proceedings of the Tenth International Conference on Very Large Data Bases, pp. 334-343, Singapore, Aug. 1984.

Pirahesh, H., J.M. Hellerstein and W. Hasan. "*Extensible/Rule Based Query Rewrite Optimaization in Starburst.*" Proceedings of ACM SIGMOD '92 International Conference on Management of Data, pp. 39-48, San Diego, CA, 1992.

Godfrey, P., J. Gryz and C. Zuzarte. "*Exploiting Constraint-Like Data Characterizations in Query Optimization.*" Proceedings of the 2001 ACM SIGMOD International Conference on the Management of Data, pp. 582-592, Santa Barbara, CA, 2001.

Gryz, J., B. Schiefer, J. Zheng and C. Zuzarte. "*Discovery and Application of Check Constraints in DB2.*" Proceedings of ICDE, 5 pages, Heidelberg, Germany, 2001.

Cheng; Q., J. Gryz, F. Koo, C. Leung, L. Liu, X. Qian and B. Schiefer. "Implementation of Two Semantic Query Optimization Techniques in DB2 Universal Database." Proceedings of the $25^{th}$ VLDB Conference, 12 pages, Edinburgh, Scotland, 1999.

IBM Technical Disclosure Bulletin. "*Access Path Selection in Relational Database Systems*," by M.S. Lakshmi and P.S. Yu, vol. 30, No. 9, Feb. 1988, pp. 420-421.

U.S. Patent Application filed on Oct. 31, 2003 entitled "*A Method for Discovering Undeclared and Fuzzy Rules in Databases*," invented by Brown, et al.

* cited by examiner

METHOD, SYSTEM, AND PROGRAM FOR QUERY OPTIMIZATION WITH ALGEBRAIC RULES

BACKGROUND OF THE INVENTION

1. Field of the Invention

The present invention is related to query optimization with algebraic rules.

2. Description of the Related Art

A database system is one in which data is stored, retrieved, and processed. One type of Database Management System (DBMS) is a Relational Database Management System. Data records in a RDBMS in a computer are maintained in tables, which are a collection of rows (records) all having the same columns. Each column maintains information on a particular type of data for the data records which comprise the rows. Tables in the database are searched using, for example, a Structured Query Language (SQL), which specifies search operations or predicates to perform on columns of tables in the database to qualify rows in the database tables that satisfy the search conditions.

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

Queries that go against a database are often taken through an optimizer within the DBMS. The optimizer is a compile time component that looks for an optimal access plan for the execution engine that retrieves the data. An access plan includes a set of access paths that are selected by the optimizer to evaluate a particular SQL statement. The access plan specifies the order of operations to resolve the execution plan, the implementation techniques (such as JOIN), and the access path for each table referenced in the statement. For example, there may be an access plan to a specific table in the database, as well as, an access plan of the order and technique in which multiple tables may be joined together to produce the desired query result. The access path represents a technique that is selected by the optimizer for retrieving data from a specific table.

In a RDBMS, the tables may have auxiliary structures, such as indexes, that may be used to access specific rows of data. For example, an access plan might make use of an index to retrieve the required data or the access plan may directly scan the table or a combination of the two. These decisions are typically based on a determination of the cost of the alternatives by estimating the number of rows of interest and consequently the cost of retrieving the appropriate blocks or pages from storage (e.g., disk) as well as the amount of computer processing units (CPU) to be utilized. Often statistics about the data that are pre-computed are used to help with the estimation process.

Another common methodology of influencing the access plan is to internally "rewrite" the query making use of other auxiliary information. Constraints that are defined and enforced might be used to eliminate joins or used to introduce predicates or derive statistics. For more information on this, see, Q. Cheng, J. Gryz, F. Koo, C. Leung, L. Liu, X. Qian and B. Schiefer. "Implementation of Two Semantic Query Optimization Techniques in DB2 UDB," In Proceedings of the 25th VLDB, pages 396–403, Kobe, Japan, 1991; J. Gryz, B. Schiefer, J. Zheng, and C. Zuzarte. "Discovery and Application of Check Constraints in DB2," In Proceedings of ICDE, Heidelberg, Germany, 2001; and, P. Godfrey, J. Gryz, C. Zuzarte. "Exploiting Constraint-like Data Characterizations in Query Optimization," In Proceedings of the 2001 ACM SIGMOD International Conference on the Management of Data, pages 582–592, Santa Barbara, Calif., 2001; each of which is incorporated by reference herein in its entirety.

Pre-computed materialized data might be used to replace a portion of the query. For more information on this; see, M. Zaharioudakis, R. Cochrane, G. Lapis, H. Pirahesh, M. Urata. "Answering Complex SQL Queries Using Automatic Summary Tables," In Proceeding of the 2000 ACM SIGMOD international conference on the management of data, pages 105–116, Dallas, Tex., 2000.

In P. Godfrey, J. Gryz, C. Zuzarte. "Exploiting Constraint-Like Data Characterizations in Query Optimization," In Proceedings of the 2001 ACM SIGMOD International Conference on the Management of Data, pages 582–592, Santa Barbara, Calif., 2001; the concept of soft constraints is discussed, including absolute soft constraints and statistical soft constraints. Additionally, the notion to use pre-computed materialized query tables that store exception data is introduced. The materialized query tables that store exception data may also be referred to as "outlier tables" or "outlier MQTs." Using this materialized query table, newly introduced predicates ("new predicates" or "new range predicates") are generated to help with the access plan of the underlying table, while the exception or outlier data is picked up from the materialized query table and added to the result (using a UNION ALL approach).

An algebraic rule is a relationship between two columns in a relational database table that may be expressed by algebraic expression. A set of algebraic rules that involve columns from one table may be implemented as integrity constraints or soft constraints to optimize queries. However, an algebraic rule that involves columns from more than one table is not used in such optimizations. Furthermore, statistical soft constraints are not used for rewriting queries.

Although existing query optimization techniques are useful, there is a need in the art for improved query optimization.

SUMMARY OF THE INVENTION

Provided are a method, system, and program for executing a query. A query is matched to an outlier materialized query table. The query is searched for a source predicate. The outlier materialized query table is searched for a target column that corresponds to a source column in the source predicate. A new range predicate is derived based on the target column and introduced into the query.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
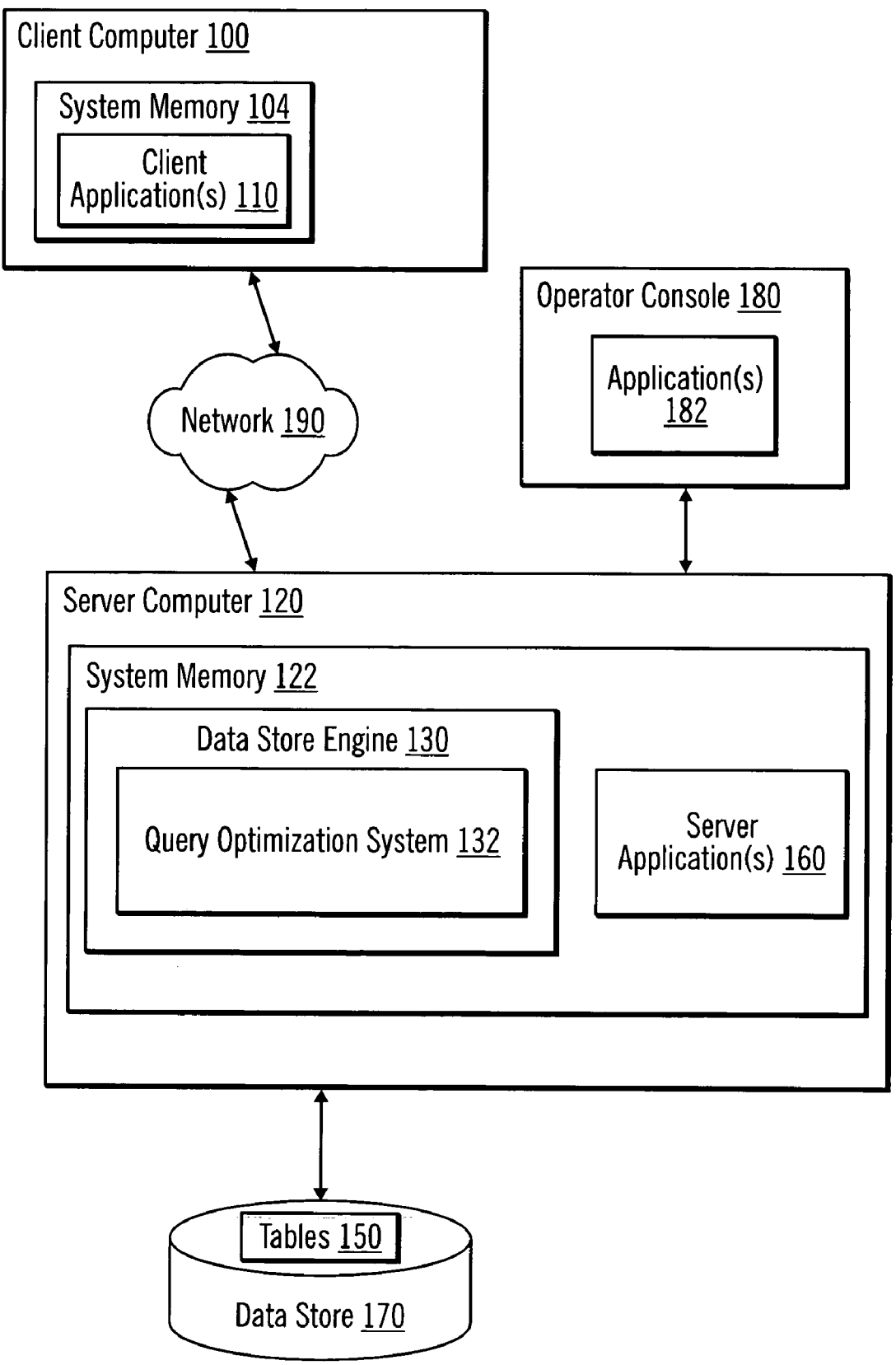
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes system memory 104, which may be implemented in volatile and/or non-volatile devices. One or more client applications 110 may execute in the system memory 104.

The server computer 120 includes system memory 122, which may be implemented in volatile and/or non-volatile devices. A data store engine 130 executes in the system memory 122. A query optimization system 132 executes as part of the data store engine 130. Additionally, one or more server applications 160 execute in system memory 122.

The server computer 120 provides the client computer 100 with access to data in a data store 170 (e.g., a database). Although a single data store 170 is illustrated for ease of understanding, tables 150 and other data in data store 170 may be stored across multiple data stores at server computer 120 or in one or more data stores at other computers connected to server computer 120. Also, an operator console 180 executes one or more applications 182 and is used to access the server computer 120 and the data store 170. Although tables 150 are referred to herein for ease of understanding, other types of structures may be used to hold the data that is described as being stored in tables 150.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes tables 150 that are used with implementations of the invention.

Implementations of the invention enable generation of a pre-computed outlier materialized query table (MQT) to improve an access plan to more efficiently retrieve data required by a query. Implementations of the invention represent algebraic rules as materialized query tables and use the outlier MQTs for query optimization. Implementations of the invention also enable use of outlier MQTs for capturing algebraic rules between two columns in a table (intra table application) or between two distinct tables (inter table application).

Figure 2:
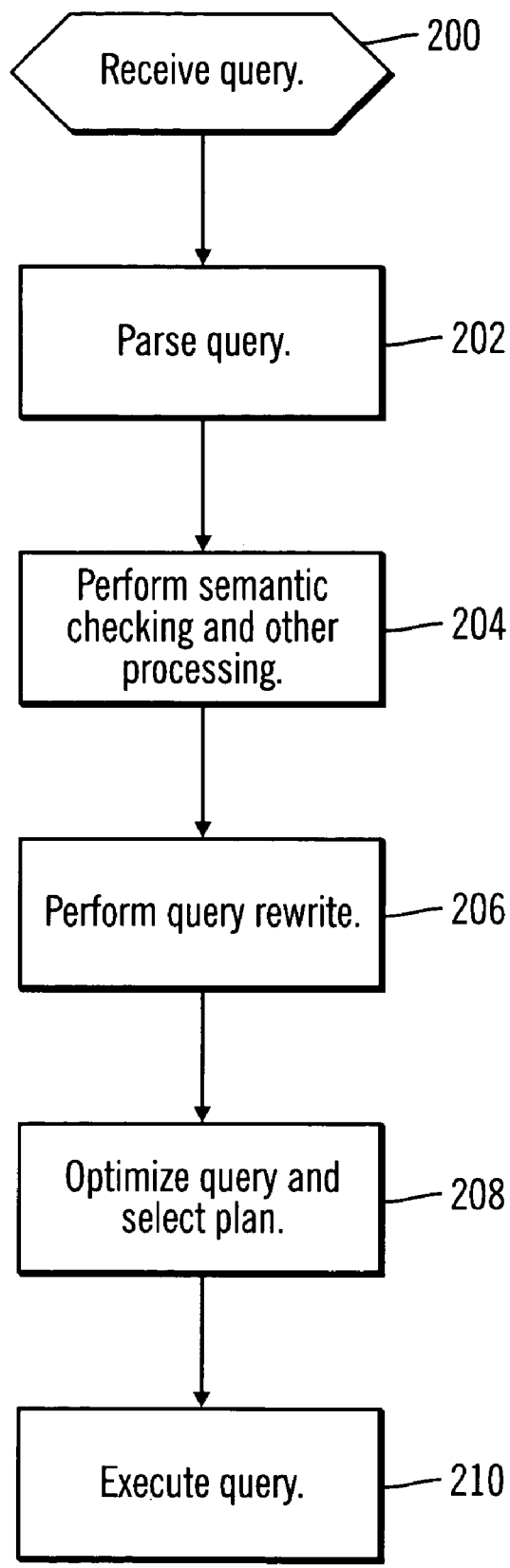
FIG. 2 illustrates logic for processing a query in accordance with certain implementations of the invention.

FIG. 2 illustrates logic for processing a query in accordance with certain implementations of the invention. Control begins at block 200 with the data store engine receiving a query. In block 202, the data store engine 130 parses the query. In block 204, the data store engine 130 performs semantic checking and other processing. In block 206, the query optimization system 132 of the data store engine 130 performs query rewrite. In block 206, both "normal" query rewrite may occur and/or query rewrite using algebraic rules as described by implementations of the invention. "Normal" query rewrite may be described as rewriting that is traditionally performed, such as subquery to join transformation, predicate pushdown, decorrelation (i.e., changing a correlated subquery into a non-correlated subquery), without the use of the techniques described herein with reference to FIGS. 5A and 5B. In block 208, the data store engine 130 optimizes the query and selects a plan. In block 210, the data store engine 130 executes the query.

Figure 3:
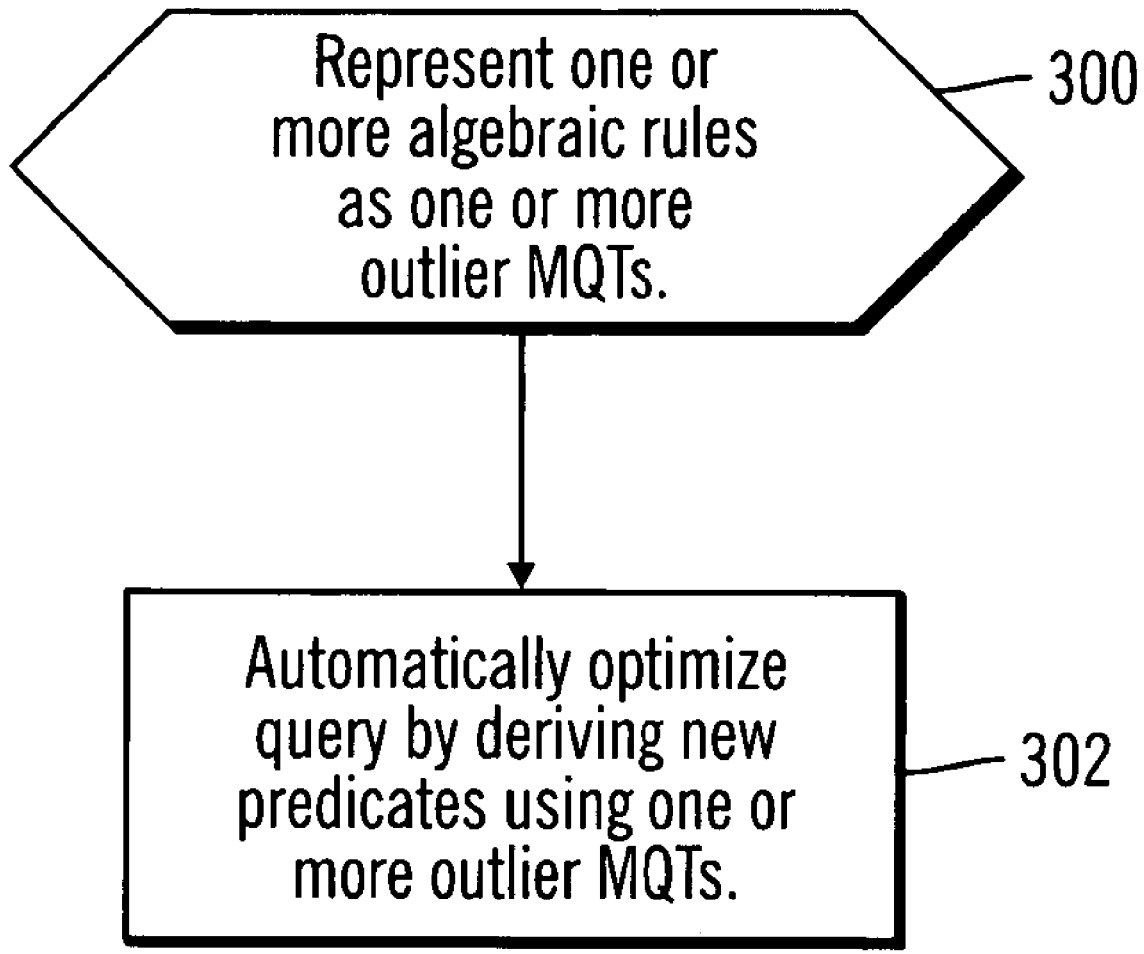
FIG. 3 illustrates logic for using outlier materialized query tables (MQTs) in accordance with certain implementations of the invention.

FIG. 3 illustrates logic for using outlier MQTs in accordance with certain implementations of the invention. Control begins at block 300 with one or more algebraic rules being represented as outlier MQTs. In certain implementations of the invention, an individual, such as a system administrator, generates the outlier MQTs either manually or using system tools. In block 302, a query is automatically optimized with the query optimization system 132, which automatically derives one or more new predicates using the outlier MQTs.

Initially (block 300 of FIG. 3), algebraic rules are represented as outlier MQTs. For a given set of algebraic rules between columns of one or more tables, an outlier MQT that captures outliers is created. The outliers may be described as records in a table that do not satisfy the algebraic rules. If there are no outliers, the data is constrained by just the algebraic rules. Otherwise, the data is constrained by the algebraic rules plus the outliers.

For example, it is expected that ordered items (e.g., office supplies ordered from a vendor) are usually shipped within a short period of time after the order is placed (e.g., within 124 days). Any shipment beyond this time period (e.g., of 124 days) may be considered an outlier.

Sample statements (1) and (2) create two tables in a database. One table is LINEITEM, and the other table is ORDERS.

```
CREATE TABLE LINEITEM                                Statement (1)
   ("L_ORDERKEY" INTEGER NOT NULL,
    "L_PARTKEY" INTEGER NOT NULL,
    "L_SUPPKEY" INTEGER NOT NULL,
    "L_LINENUMBER" INTEGER NOT NULL,
    "L_QUANTITY" DOUBLE NOT NULL,
    "L_EXTENDEDPRICE" DOUBLE NOT NULL,
    "L_DISCOUNT" DOUBLE NOT NULL,
    "L_TAX" DOUBLE NOT NULL,
    "L_RETURNFLAG" CHAR(1) NOT NULL,
    "L_LINESTATUS" CHAR(1) NOT NULL,
    "L_SHIPDATE" INTEGER NOT NULL,
    "L_COMMITDATE" INTEGER NOT NULL,
    "L_RECEIPTDATE" INTEGER NOT NULL,
    "L_SHIPINSTRUCT" CHAR(25) NOT NULL,
    "L_SHIPMODE" CHAR(10) NOT NULL,
    "L_COMMENT" VARCHAR(44) NOT NULL)
```

```
CREATE TABLE ORDERS                                  Statement (2)
   ("O_ORDERKEY" INTEGER NOT NULL,
    "O_CUSTKEY" INTEGER NOT NULL,
    "O_ORDERSTATUS" CHAR(1) NOT NULL,
    "O_TOTALPRICE" DOUBLE NOT NULL,
    "O_ORDERDATE" INTEGER NOT NULL,
```

```
                                -continued
"O_ORDERPRIORITY" CHAR(15) NOT NULL,
"O_CLERK" CHAR(15) NOT NULL,
"O_SHIPPRIORITY" INTEGER NOT NULL,
"O_COMMENT" VARCHAR(79) NOT NULL)
```

For an ordered item, an ordering date (O_ORDERDATE) in the ORDERS table and a shipping date (L_SHIPDATE) in the LINEITEM table may be stored as integers returned by a SQL function DAYS, to simplify performing algebraic operations on them.

Sample statement (3) creates an outlier MQT that captures a relationship between the ordering date (O_ORDERDATE) and the shipping date (L_SHIPDATE). In sample statement (3), the predicate (NOT ((L.L_SHIPDATE–O.O_ORDERDATE) between 0 and 124)) is an outlier predicate. An outlier predicate is found in an MQT.

```
CREATE TABLE AUTO.ARAMASTI AS                              Statement (3)
    (SELECT O.O_ORDERKEY, L.LINENUMBER,
    O.O_ORDERDATE, L.L_SHIPDATE
    FROM ORDERS O, LINEITEM L
    WHERE O.O_ORDERKEY = L.L_ORDERKEY AND
    (NOT( (L.L_SHIPDATE - O.O_ORDERDATE) BETWEEN
    0 AND 124)))
```

An algebraic rule may also be based on multiple peaks or bumps. For example, it might be the case that an item for a rush order is typically shipped within 7 days, while an item for a normal (i.e., non-rush) order might typically be shipped between 30 to 45 days. Looking at the number of days between the order date and the ship date of the various items, the number of days for a large number of items may fall between 0 and 7 days, while the number of days for another large number of items may fall between 30 and 45 days. The items that do not fall in these two, groups may be a small number and are outlier items that may be captured in a materialized query table with the predicate: (NOT (((L.L_SHIPDATE–O.O_ORDERDATE) BETWEEN 0 AND 7) OR ((L.L_SHIPDATE–O.O_ORDERDATE) BETWEEN 30 AND 45))).

Figure 4:
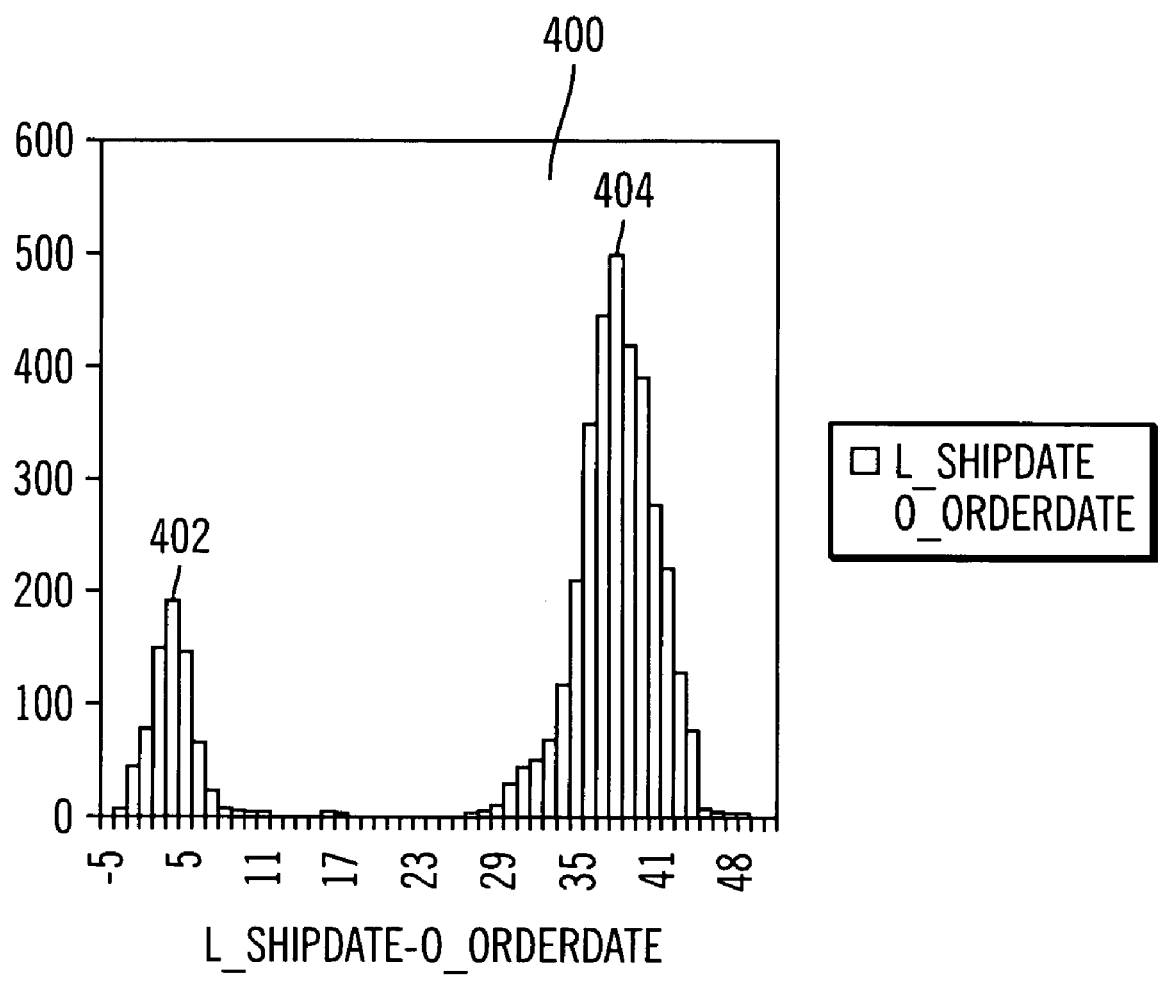
FIG. 4 illustrates a histogram in accordance with certain implementations of the invention.

Sample statement (4) and FIG. 4 will be used to explain bumps. If statement (4) is executed, with the resulting data points corresponding to records being plotted as a histogram 400 as in FIG. 4, then, the two clauses in the predicate, which correspond to the "bumps" in the histogram of FIG. 4 correspond to shipping methods for two types of orders. Each bump has a lower bound (0 for bump 402 and 35 for bump 404) and an upper bound (7 for bump 402 and 45 for bump 404).

```
SELECT L.L_SHIPDATE - O.O_ORDERDATE                         Statement (4)
FROM orders, lineitem
WHERE orders.o_orderkey= lineitem.l_orderkey
```

Multiple rules between different columns may also be combined into a single materialized query table by logically ANDing the rules. For example, in addition to the relationship between ORDERDATE and SHIPDATE, there may be a relationship between RECEIVEDATE and SHIPDATE. The corresponding outlier materialized query table may be created with sample statement (5). Sample statement (5) represents an outlier MQT definition for a rule with multiple bumps (i.e., (L.L_SHIPDATE–O.O_ORDERDATE BETWEEN 0 AND 7) OR (L.L_SHIPDATE–O.O_ORDERDATEBETWEEN 30 AND 45)) and for a rule with a single bump (i.e., L.L_RECEIVEDATE–L.L_SHIPDATE BETWEEN 7 AND 30).

```
CREATE TABLE OUTLIERS AS                                    Statement (5)
    (SELECT O.O_ORDERKEY, L.LINENUMBER,
    O.O_ORDERDATE, L.L_SHIPDATE, L.L_RECEIVEDATE
    FROM ORDERS O, LINEITEM L
    WHERE O.O_ORDERKEY = L.L_ORDERKEY AND
    (NOT (((L.L_SHIPDATE - O.O_ORDERDATE BETWEEN
    0 AND 7)
    OR (L.L_SHIPDATE - O.O_ORDERDATE BETWEEN
    30 AND 45))
    AND (L.L_RECEIVEDATE - L.L_SHIPDATE BETWEEN
    7 AND 30 )))
```

For capturing rules between columns in one table, called intra-table rules, the outlier MQT definition may be simplified as in sample statement (6), where no join is used. That is, sample statement (6) represents an outlier MQT definition for an algebraic rule between columns in one table.

```
CREATE TABLE OUTLIERS AS                                    Statement (6)
    (SELECT L.LINENUMBER, O.O_ORDERDATE,
    L.L_SHIPDATE, L.L_RECEIVEDATE
    FROM LINEITEM L
    WHERE
    (NOT((L.L_RECEIVEDATE - L.L_SHIPDATE BETWEEN
    7 AND 30)))
    )
```

A general form of an outlier MQT for capturing rules between two tables is described in a co-pending and commonly owned patent application U.S. patent application Ser. No. 10/697,052, entitled "A Method for Discovering Undeclared and Fuzzy Rules in Databases", by Paul Brown, and filed on Oct. 31, 2003, which is incorporated by reference herein in its entirety. Sample statement (7) represents a general form of the outlier MQT for representing inter-table rules

```
CREATE ABLE "SCHEMA".TABLE_NAME AS                          Statement (7)
( SELECT TPK.PK_One AS TPK_PK_ONE,
    TPK.PK_Two AS TPK_PK_TWO,
    ...
    TPK.PK_N AS TPK_PK_N,
    TFK.PK_One AS TFK_PK_ONE,
    TFK.PK_TWO AS TFK_PK_TWO,
    ...
    TFK.PK_M AS TFK_PK_M,
    TFK.FK_ONE AS TFK_FK_ONE,
    TFK.FK_TWO AS TFK_FK_TWO,
    ...
    TFK.FK_N AS TFK_FK_N,
    TPK.AC_1_COL_1 AS TPK_AC_1_1,
    TPK.AC_1_COL_2 AS TPK_AC_1_2,
    TPK.AC_2_COL_1 AS TPK_AC_2_1,
    TPK.AC_2_COL_2 AS TPK_AC_2_2,
    TPK.AC_3_COL_1 AS TPK_AC_3_1,
    TFK.AC_3_COL_1 AS TFK_AC_3_1

FROM "SCHEMA".PK_TABNAME TPK,
    "SCHEMA".FK_TABNAME TFK,
    WHERE TPK.KEY_COL_ONE = TFK.KEY_COL_ONE
        AND TPK.KEY_COL_TWO = TFK.KEY_COL_TWO
        ...
        AND TPK.KEY_COL_N = TFK.KEY_COL_N
```

```
        AND (
            NOT (
                (
                (TPK.AC_1_COL_2-TPK.AC_1_COL_2)
                    BETWEEN :V1 AND :V2
                OR (TPK.AC_1_COL_1-TPK.AC_1_COL_2)
                    BETWEEN :V3 AND :V4
                )
                AND
                (
                (TPK.AC_2_COL_1/TPK.AC_2_COL_2)
                    BETWEEN :V5 AND :V6
                )
                AND
                (
                (TFK.AC_3_COL_1-TPK.AC_3_COL_2)
                    BETWEEN :V7 AND :V8
                )
            ))
        )
```

To reduce the number of outlier MQTs created for establishing the rules, inter-table and intra-table rules may be combined into one outlier MQT using a full outer join (FOJ) as in sample statement (8). Full outer join allows a materialized query table to be used, even if the materialized query table has reference to a second table that is not referenced within the query. Sample statement (8) represents a generic form of an outlier MQT for representing inter-table and intra-table rules.

```
CREATE TABLE "SCHEMA".TABLE_NAME AS          Statement (8)
( SELECT TPK.PK_One AS TPK_PK_ONE,
    TPK.PK_Two AS TPK_PK_TWO,
    ...
    TPK.PK_N AS TPK_PK_N,
    TFK.PK_One AS TFK_PK_ONE,
    TFK.PK_TWO AS TFK_PK_TWO,
    ...
    TFK.PK_M AS TFK_PK_M,
    TFK.FK_ONE AS TFK_FK_ONE,
    TFK.FK_TWO AS TFK_FK_TWO,
    ...
    TFK.FK_N AS TFK_FK_N,
    TPK.AC_1_COL_1 AS TPK_AC_1_1,
    TPK.AC_1_COL_2 AS TPK_AC_1_2,
    TPK.AC_2_COL_1 AS TPK_AC_2_1,
    TPK.AC_2_COL_2 AS TPK_AC_2_2,
    TPK.AC_3_COL_1 AS TPK_AC_3_1,
    TFK.AC_3_COL_1 AS TFK_AC_3_1
```

```
FROM "SCHEMA".PK_TABNAME TPK FULL OUTER JOIN
    "SCHEMA".FK_TABNAME TFK
on TPK.KEY_COL_ONE = TFK.KEY_COL_ONE
    AND TPK.KEY_COL_TWO = TFK.KEY_COL_TWO
    ...
    AND TPK.KEY_COL_N = TFK.KEY_COL_N
where (
    NOT (
        (
        (TPK.AC_1_COL_2-TPK.AC_1_COL_2)
            BETWEEN :V1 AND :V2
        OR (TPK.AC_1_COL_1-TPK.AC_1_COL_2)
            BETWEEN :V3 AND :V4
        )
        AND
        (
        (TPK.AC_2_COL_1/TPK.AC_2_COL_2)
            BETWEEN :V5 AND :V6
        )
        AND
        (
        (TFK.AC_3_COL_1-TPK.AC_3_COL_2)
            BETWEEN :V7 AND :V8
        )
    ))
)
```

Once outlier MQTs representing algebraic rules are created, a query may be optimized using these outlier MQTs (block 302 FIG. 3). Each outlier MQT defines a set of algebraic rules. There may be one or more outlier MQTs. The optimization for queries is achieved by deriving new predicates. These predicates make it possible to reduce the domain of search. For example, new indexes may be used or rows may be filtered closer to the source of the data, such as disks. In certain implementations of the invention, the focus is on queries with range or equality predicates. The derived predicates are equality or range predicates as well. This allows for a simplification that covers many of the common expressions. Sample statement (9) represents a query that includes a range predicate (i.e., a predicate on ORDERS. O_ORDERDATE, restricting orders to those in a range between 1993-07-01 and 1993-09-30). This range predicate is called a source predicate because it is the source from which a new predicate is derived. The source predicate is found in a query.

```
SELECT                                       Statement (9)
    O_ORDERPRIORITY, L_SUPPKEY
    COUNT(*) AS ORDER_COUNT
FROM
    ORDERS, LINEITEM
WHERE
    O_ORDERDATE >= DAYS (DATE('1993-07-01'))
    AND O_ORDERDATE < DAYS(DATE ('1993-07-01') +
    3 MONTH)
    AND L_ORDERKEY = O_ORDERKEY
    AND L_COMMITDATE < L_RECEIPTDATE
    )
GROUP BY
    O_ORDERPRIORITY, L_SUPPKEY
```

Starting with the algebraic rule between O_ORDERDATE and L_SHIPDATE (i.e., sample statement (3)), this algebraic rule states that the LINEITEM records associated with an order record for most of the cases has a ship date within 124 days after the order date. Implementations of the invention add a new range predicate on L_SHIPDATE, which restricts the search on the LINEITEM table. The new range predicate may also be referred to as a target predicate. The columns on which the new range predicate operates may be referred to as target columns.

If there are no outliers associated with this algebraic rule, then the new semantically equivalent predicate is based on taking the query predicates and replacing the O_ORDERDATE column by the L_SHIPDATE column and is as follows in predicate (1):

```
L_SHIPDATE >= DAYS (DATE('1993-07-01')) + 0        Predicate (1)
and L_SHIPDATE < DAYS(date ('1993-07-01') + 3 month ) + 124
```

If there are outliers, then predicate (1) is not semantically equivalent and the calculation of the range for the new predicates considers the outliers that are stored in the outlier MQT. Additional adjustments may be made to form the new predicate.

There are two techniques to construct the range of the new predicate: a range multiplying technique or a range stretching technique. In certain implementations of the invention, the range multiplying technique results in better performance gains than a range stretching technique. The construction of the range of the new predicate merges the following to get the new bumps: 1) the bumps specified by the algebraic rules, 2) the distances between potential target columns and source columns of outlier records, and 3) the source range.

The bounds for the new predicate are generated using a subquery implementing either the range multiplying technique or the range stretching technique. The subquery is called a bounds view and has two output columns, LB for lower bound and UB for upper bound.

In the range multiplying technique, a distance between two interesting columns is computed for all qualified outliers. Interesting columns may be described as potential source and target columns. The distance between two columns may be described as by a bump (a minimum distance, referred to as a lower bound, and a maximum distance, referred to as an upper bound). A width of a bump may be described as the distance between the lower bound and the upper bound of the range. The outliers may be considered to fall into the bump of width zero. That is, the lower bound and upper bound of the bump is the same for the outliers. Moreover, the bumps specified by the algebraic rule are UNIONed with the bumps of all qualified outliers. The widths of the resulting bumps are then adjusted by adding the width of the source range to the upper bounds. The bumps are ordered by lower bounds, and overlapping bumps are merged into a wider bump. Non-overlapping bumps stay as they are. With this processing, there are one or more new bumps for the target column. The possible data points of the target column that satisfy the query fall into the new bumps.

Sample statement (10) represents a query optimized using the range multiplying technique on sample statement (9). For example, the WITH DPAT clause refers to a view. The UNION ALL clause incorporates outliers. Each outlier may be considered to be one bump of zero width; that is, both the lower bound and upper bound are the distance between ship date and order date. The QUERYRANGE clause determines a range for the query (e.g., three months and this is added to the upper bound of the bumps to extend the bump width). The MERGEDQUERYRANGE0 and MERGEDQUERYRANGE clauses each merge multiple overlapping small bumps into a large common bump. The SELECT O_ORDERPRIORITY, L_SUPPKEY, COUNT(*) AS ORDER_COUNT FROM ORDERS, LINEITEM, BOUNDS clause joins the BOUNDs view with the ORDERS view and the LINEITEMS view and includes the new predicate (AND L_SHIPDATE BETWEEN DAYS (DATE('1997-07-01'))+LB AND DAYS(DATE('1997-07-01'))+UB).

```
WITH DPAT (DLB, DUB) AS                         Statement (10)
(
    VALUES (0, 124)
    UNION ALL
    (
    SELECT OUTLIER_DISTANCE AS LB, OUTLIER_DISTANCE
        AS UB
    FROM
        (SELECT DISTINCT L_SHIPDATE - O_ORDERDATE AS
    OUTLIER_DISTANCE
        FROM AUTO.ARAMAST1
        WHERE NOT (L_SHIPDATE- O_ORDERDATE BETWEEN
        0 AND 124)
        AND O_ORDERDATE >= DAYS(DATE('1997-07-01')) AND
    O_ORDERDATE < DAYS(DATE ('1997-07-01') + 3 MONTH)
        ) AS Q
    )
),
QUERYRANGE AS
(SELECT ROWNUMBER() OVER (ORDER BY DLB) AS
    SEQUENCE,
    DLB, DUB, DUB +
    DAYS(DATE('1997-07-01') + 3 MONTH) -
DAYS(DATE('1997-07-01')) AS AUB
    FROM DPAT
),
MERGEDQUERYRANGE0 (SEQUENCE, DLB, AUB,
    INHERITED) AS
(SELECT SEQUENCE, DLB, AUB, 0 AS INHERITED
    FROM QUERYRANGE
    WHERE SEQUENCE = 1
UNION ALL
(SELECT SEQUENCE, CASE INHERITED WHEN 0 THEN
    DT_DLB ELSE
MQR0_DLB END AS DLB, DT_AUB, INHERITED
    FROM
    (SELECT DT.SEQUENCE, CASE WHEN MQR0.AUB <= DT.DLB
    THEN 0 ELSE 1 END AS INHERITED,
        MQR0.DLB AS MQR0_DLB, MQR0.AUB AS MQR0_AUB,
    DT.DLB AS DT_DLB, DT.AUB AS DT_AUB
        FROM MERGEDQUERYRANGE0 MQR0, QUERYRANGE AS DT
        WHERE MQR0.SEQUENCE +1 = DT.SEQUENCE
    ) AS Q
)
),
MERGEDQUERYRANGE AS
(SELECT DLB AS LB, AUB AS UB,
    CASE WHEN MAX(INHERITED) OVER (ORDER BY DLB ROWS
BETWEEN 1 FOLLOWING AND 1 FOLLOWING) =1
    THEN 0 ELSE 1 END AS SURVIVE,
    INHERITED
    FROM MERGEDQUERYRANGE0
),
BOUNDS AS
(SELECT *
    FROM MERGEDQUERYRANGE
    WHERE SURVIVE = 1
)
SELECT O_ORDERPRIORITY, L_SUPPKEY, COUNT(*) AS
    ORDER_COUNT
FROM ORDERS, LINEITEM, BOUNDS
WHERE O_ORDERDATE >= DAYS(DATE ('1997-07-01')) AND
O_ORDERDATE < DAYS(DATE ('1997-07-01') + 3 MONTH)
AND L_ORDERKEY = O_ORDERKEY AND L_COMMITDATE <
    L_RECEIPTDATE
AND L_SHIPDATE BETWEEN DAYS(DATE('1997-07-01')) + LB
        AND DAYS(DATE('1997-07-01')) + UB
GROUP BY O_ORDERPRIORITY, L_SUPPKEY;
```

Sample statement (11) represents a query optimized using the range stretching technique on sample statement (9). In the range stretching technique, a maximum and minimum distance between two interesting columns of qualified outliers are computed. The minimum distance is then compared to the lower bounds of ranges specified by the algebraic rule. The smallest lower bound is chosen as the lower bound of a new range. The maximum distance is compared to the upper bounds of the algebraic rule, and the largest upper bound is chosen as the upper bound of the new range. Then, the source range is added to the upper bound to obtain the new range for a target column. The WITH BOUNDS AS clause creates a BOUNDS view. AUTO.ARAMAST1 represents an outlier MQT. The clause FROM (SELECT (MAXL_SHIPDATE−O_ORDERDATE) AS OUTLIER_UB, (MINL_SHIPDATE−O_ORDERDATE) AS OUTLIER_LB FROM AUTO.ARAMAST1 clause uses the outlier MQT to select an outlier upper bound and an outlier lower bound. The SELECT O_ORDERPRIORITY, L_SUPPKEY, COUNT(*) AS ORDER_COUNT FROM ORDERS, LINEITEM, BOUNDS clause joins the BOUNDs view with the ORDERS view and the LINEITEMS view and includes the new predicate (AND L_SHIPDATE BETWEEN DAYS (DATE('1997-07-01'))+LB AND DAYS(DATE('1997-07-01')+3 MONTH)+UB).

```
WITH BOUND AS (SELECT                         Statement (11)
    CASE WHEN OUTLIER_UB > 124 THEN OUTLIER_UB
ELSE 124 END AS UB,
    CASE WHEN OUTLIER_LB < 0 THEN OUTLIER_LB ELSE 0
END AS LB
    FROM (SELECT (MAXL_SHIPDATE - O_ORDERDATE) AS
OUTLIER_UB,
              (MINL_SHIPDATE - O_ORDERDATE) AS
OUTLIER_LB
        FROM AUTO.ARAMAST1
WHERE NOT (L_SHIPDATE- O_ORDERDATE BETWEEN
0 AND 124)
AND O_ORDERDATE >= DAYS(DATE('1997-07-01')) AND
O_ORDERDATE
< DAYS(DATE ('1997-07-01') + 3 MONTH)))
SELECT O_ORDERPRIORITY, L_SUPPKEY, COUNT(*) AS
ORDER_COUNT
FROM ORDERS, LINEITEM, BOUNDS
WHERE O_ORDERDATE >= DAYS(DATE ('1997-07-01')) AND
O_ORDERDATE < DAYS(DATE ('1997-07-01') + 3 MONTH ) AND
L_ORDERKEY = O_ORDERKEY AND L_COMMITDATE <
L_RECEIPTDATE
 AND L_SHIPDATE BETWEEN DAYS(DATE('1997-07-01') + LB
    AND DAYS(DATE('1997-07-01') + 3 MONTH) + UB
GROUP BY O_ORDERPRIORITY, L_SUPPKEY;
```

If the target column is on the left hand side of a subtraction expression in the algebraic rule, the new predicate has a form shown in predicate (2). If the target column is on the right hand side of a subtraction expression in the algebraic rule, the new predicate has a form shown in predicate (3).

target-column between "low bound of source range+
    lb" and "low bound of source range"+ub.     Predicate (2).

target-column between "up bound of source range−
    ub" and "up bound of source range"−lb.     Predicate (3).

In the above discussion with reference to predicates (2) and (3), the target column (L_SHIPDATE), on which a new predicate was introduced, is not nullable. When the target column is nullable (i.e., contains at least one null value), the new predicate is false for the null value, and this may adversely eliminate records. To compensate for the null value processing, for the range multiplying technique, implementations of the invention add a rownumber column into the bounds subquery. The value of the rownumber column is the sequence number of rows output from the bounds subquery. Then, the new predicate has one of the forms shown in predicates (4) or (5) for a nullable target column for the range multiplying technique.

(target-column between "low bound of source
    range+lb" and "low bound of source range"+
    ub) or (target-column is null and rownumber=1)   Predicate (4)

(target-column between "up bound of source range−
    ub" and "up bound of source range"−lb) or (target-column is null and rownumber=1)    Predicate (5)

In predicates (4) and (5), the expression rownumber=1 is used to eliminate duplicate records that may be introduced by the new predicate.

If the bounds subquery is using a range stretching technique for calculation, because the bounds subquery produces one row, a rownumber column is not added to the bounds subquery. The new predicate has one of the forms shown in predicates (6) or (7) for a nullable target column for the range stretching technique.

(target-column between "low bound of source
    range+lb" and "low bound of source range"+
    ub) or (target-column is null)                   Predicate (6)

(target-column between "up bound of source range−
    ub" and "up bound of source range"−lb) or (target-column is null)                   Predicate (7)

The above technique for generating new predicates may be extended to handle algebraic relationships between two sets of columns (i.e., the source predicate and the target predicate each reference a group of columns). This is, given two sets of columns (COL11, COL12, ... ,COL1m) and (COL21, COL22, ... ,COL2n) where m>0, n>0, and two row functions F1 and F2, implementations of the invention allow specification of an algebraic relation between derived columns F1_COL=F1(COL11, COL12, ... ,COL1m), and F2_COL=F2(COL21, COL22, ... ,COL2n). Additionally, implementations of the invention allow introduction of a new range predicate on F1_COL or F2_COL into the query, given source predicates on columns COL21, COL22, ... ,COL2n or on columns COL11, COL12, ... ,COL1m are found in the query.

For example, referring to the example in sample statement (3) and assuming that a database schema SHIPDATE is represented by (SHIPYEAR, SHIPMONTH, SHIPDAY), and a database schema ORDERDATE is represented by (ORDER_YEAR_MONTH, ORDER_DAY), there exists row function F1 such that F1(SHIPYEAR, SHIPMONTH, SHIPDAY) equals SHIPDATE, and row function F2 such that F2(ORDER_YEAR_MONTH, ORDERDAY) equals ORDERDATE. That is, row functions F1 and F2 are mapping functions that map multiple columns to a single derived column. Then, the relationship between SHIPDATE and ORDERDATE may be described with predicate (8). That is, predicate (8) represents an algebraic rule between two sets of derived columns.

(NOT ((F1(SHIPYEAR, SHIPMONTH, SHIPDAY) -       Predicate (8)
F2(ORDER_YEAR_MONTH, ORDER_DAY) BETWEEN
0 AND 124)))

The technique for calculating a new range predicate applies, but the calculation for new ranges are all based on the derived columns, and the target column (i.e., the left hand side of the new predicate) is a derived column as well, as illustrated with predicates (9) and (10), which are predicates on composite columns.

F1 (SHIPYEAR, SHIPMONTH, SHIPDAY) between
    "low bound of source range+lb" and "low
    bound of source range"+ub.                   Predicate (9)

F2(ORDER_YEAR_MONTH, ORDER_DAY)
    between "up bound of source range−ub" and
    "up bound of source range"−lb.               Predicate (10)

In certain implementations of the invention, in order to calculate the source range for the derived column from the given source ranges on base columns, the row function F1 or F2 may be a monotonic function that is deterministic and has no side-effects. If row function F1 or F2 is nullable, then the corresponding derived column is nullable, and the technique for calculating new range predicate for a nullable target column is applied.

With appropriate support of row expressions (i.e., involving multiple columns) in the DBMS and suitable indexes on the columns involved, it is possible to exploit the more complex derived predicates as appropriate starting and stopping conditions.

As a simplification, if row functions F1' or F2' (i.e., the reverse row functions of F1 or F2) may be computed, the predicate may be further simplified so that an index on a most significant column may be used when establishing an access path. This may be useful if row expressions are not supported in the DBMS or if the indexes do not include all of the columns in one set. In any case, the new predicates are always useful for early elimination of records.

For example, a SQL YEAR function may be used as a reverse function. So a predicate on SHIPYEAR may be derived with predicate (11).

SHIPYEAR between Year ("low bound of source range+lb") and Year ("low bound of source range+ub")       Predicate (11)

Columns in each set may come from different tables. As long as the tables are joined together and all join predicates are matched, new predicates may be derived between a query and an MQT.

Implementations of the invention rewrite a query using the outlier MQTs that express algebraic rules. Query rewrite techniques using a Query Graph Model (QGM) may be performed. For more information on a QGM, see Pirahesh, J. Hellerstein, and W. Hasan, "Extensible/Rule Based Query Rewrite Optimization in STARBURST," Proceedings of ACM SIGMOD '92 International Conference on Management of Data, San Diego, Calif., 1992, which is incorporated by reference herein in its entirety. A QGM represents a semi-procedural dataflow graph of a query. In a QGM, boxes are used to represent relational operations, while arcs between boxes represent table references and are referred to as quantifiers. Each box includes input columns, predicates that are to be applied, output columns that are computed, and may include other properties. Other properties that may be included in a box include, for example, an order specification, a distinct flag, etc.

A basic set of boxes may include those for SELECT, GROUP BY, and UNION. SELECT boxes represent the select-project-join portions of SQL queries, apply join predicates and selection predicates (e.g., WHERE or HAVING predicates), and compute any scalar expressions that may appear in a query. GROUP-BY boxes include a set of grouping columns (i.e., a grouping set) by which grouping is performed and compute one or more aggregate functions. For ease of understanding, the process of rewriting queries with algebraic rules is discussed in the context of representing a query as a QGM.

Figure 5A:
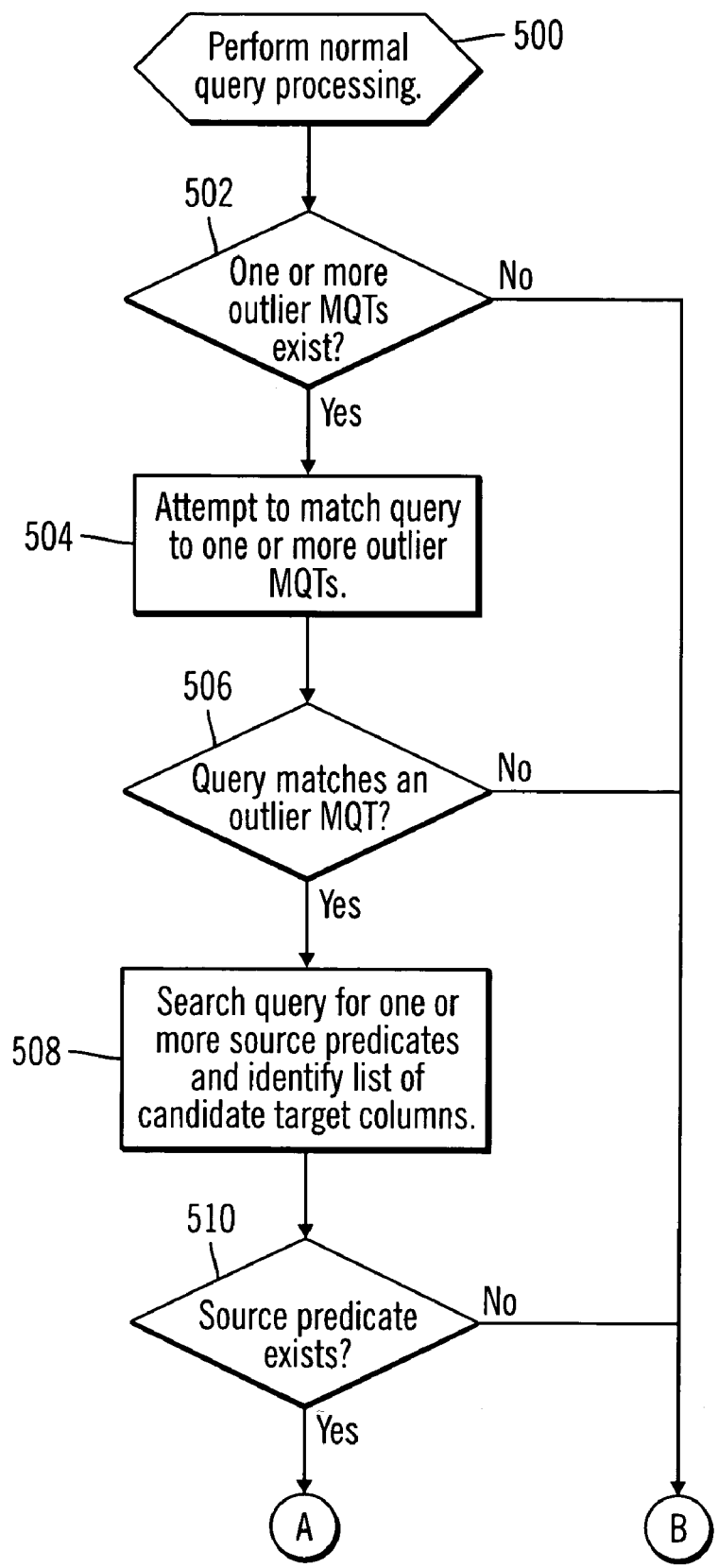
FIGS. 5A and 5B illustrate logic for rewriting queries with algebraic rules in accordance with certain implementations of the invention.
Figure 5B:
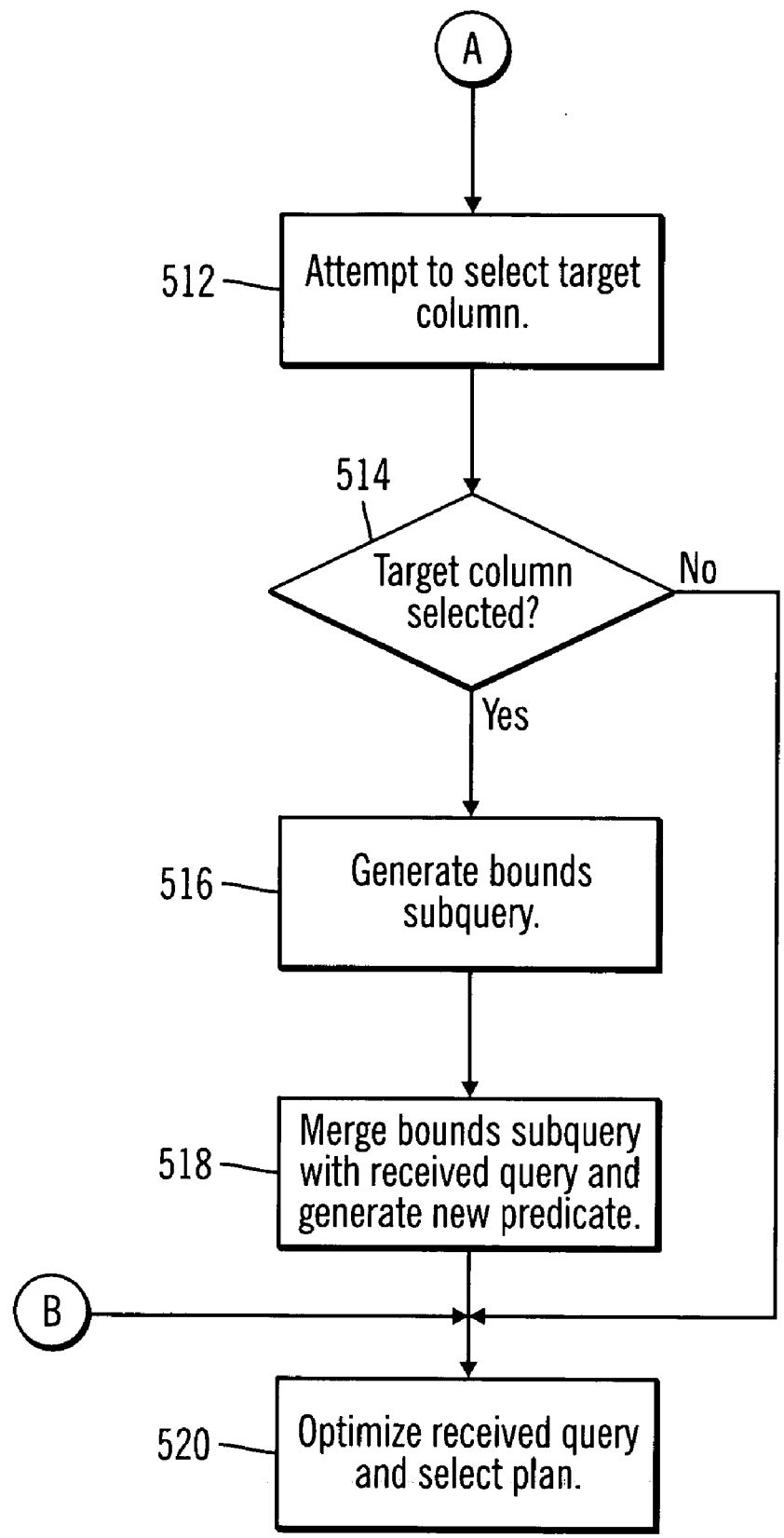

FIGS. 5A and 5B illustrate logic for rewriting queries with algebraic rules in accordance with certain implementations of the invention. Control begins at block 500 with the data store engine 130 performing normal query processing. Normal query processing includes processing, such as that in blocks 200-220 of FIG. 2. Normal query processing may also include normal query rewrite.

In block 502, the query optimization system 132 determines whether one or more outlier MQTs exist. If so, processing continues to block 504, otherwise, processing continues to block 520. In block 502, during an identification phase, one or more outlier MQTs may be identified. Verification of the MQTs may be done either at the time the MQT is defined or at the time when the MQT is used in query optimization.

The verification of an outlier MQT may verify that the outlier MQT specifies a select from one table or a join (including outer join) of two or more base tables and that the outlier MQT has one query block; an outlier predicate is specified; columns referenced by the outlier predicate are present in the output of the outlier MQT; and the type of columns involved in the algebraic rules represented by the outlier MQT may be any data type that supports a range predicate. For example, date, timestamp, and time are supported, in addition to any numerical data types, such as integer or floating type.

The outlier MQT stores those rows that do not satisfy the relationship of interest (defined by one or more algebraic rules) between columns. A join predicate may be present that captures an inter-table relationship between columns. For capturing intractable relationships, an outlier MQT defined over a single table may be used. Alternatively, intractable and inter-table relationships may be combined into one outlier MQT using the outer join.

The outlier MQTs are kept in sync with base tables. That is, whenever data is inserted or updated in the underlying base tables, the outlier MQTs are updated, as needed. This may be done either manually or automatically by, for example, an application program or by the data store engine 130.

The outlier predicate is characterized by a NOT expression having as its arguments, range binding conjuncts. Each conjunct in the NOT predicate defines a relationship between two columns, called a range binding. A range binding may be a single range (i.e., bump) as shown in range binding (1) or multiple ranges (i.e., bumps) as illustrated in range binding (2). A subtraction expression (e.g. (L_SHIPDATE−O_ORDERDATE)) may be referred to as a binding expression.

| | |
|---|---|
| (L_SHIPDATE- O_ORDERDATE BETWEEN 0 AND 124) | Range Binding (1) |
| ((L_SHIPDATE- O_ORDERDATE BETWEEN 0 AND 30) OR(L_SHIPDATE- O_ORDERDATE BETWEEN 90 AND 124)) | Range Binding (2) |

In block 504, the query optimization system 132 attempts to match the query to at least one outlier MQT. During the outlier MQT match process, the query optimization system 132 attempts to match one or more outlier MQTs to a query to identify a set of rules applicable to the query. In certain implementations of the invention, in a DBMS, the matching is performed after parsing the query and the outlier MQTs into QGM representations. Then, a rewrite process may be used to do the matching. This matching of a query and an outlier MQT using QGM representations is further described in U.S. patent application Ser. No. 09/502,821, entitled "Optimizing Queries Using Automatic Summary Tables", by Cochrane et al., and filed on Feb. 11, 2000, which is incorporated by reference herein in its entirety.

With QGM representations, the query and the outlier MQT are matched bottom up, box by box. If a pair of boxes match, then an attempt is made to match their parents. In particular, at the bottom of the QGM representations are the base tables that may be matched by their names. A facility including a quantifier and column mapping is used to translate an expression in query context into an expression in the outlier MQT context for the purpose of comparison and building compensation. When there is not an exact match, some additional operations may applied over the MQT to create a match between the query and the MQT, and these additional operations may be referred to as compensation.

For example, in the QGM representation of the outlier MQT, the second level operation may be a select or a join. The second level operation is compared with the select or join of the query directly over the matched one or more base tables. During the comparison, the predicates in the query are transferred to the select or join operation of the outlier MQT and compared with the original predicates of the outlier MQT. If there is a join in the outlier MQT and all the join predicates (other than the outlier predicate) in the outlier MQT operation have matching predicates in the query, then a new derived range predicate is created in the given query box by picking appropriate columns (referred to as target columns) from the base tables involved in the join. The target column can be from the same table as the source column (referred as an intra-table case) or from a different table in which the source column resides (referred as an inter-table case).

There are multiple cases for which we can derive new intra-table predicates. In one intra-table case, the MQT is a select from a single table and there is no join in the MQT, and the new predicate references the same base table corresponding to the source column. In another intractable case, an outlier MQT is defined with an outer join, the join predicates do not match, and the new predicate also references the same base table corresponding to the source column on the tuple preserving side.

In block 506, the query optimization system 132 determines whether the query matches at least one outlier MQT. If so, processing continues to block 508, otherwise, processing continues to block 510. In block 508, the query optimization system 132 searches the query for one or more source predicate ranges. During this query predicate identification process, an operation in the current QGM box is searched for range predicates on a single column, and these are used as source predicates for deriving new range predicate on other columns.

Also, in block 508, a list of candidate target columns that may be used in the new range predicate are found. In particular, for each source predicate, a corresponding outlier predicate from an outlier MQT is searched for target columns on which a new range predicate may be derived. A column may be a candidate target column if the column occurs on one side of the binding expression (e.g. (L_SHIPDATE–O_ORDERDATE)) and the source column occurs on the other side. Since it is decided during the matching process whether the new range predicate can be an inter-table one or not, target columns are collected from the same quantifier of source columns in the intra-table case, and those from a different table as that of source columns for the inter-table case.

In block 510, the query optimization system determines whether at least one source predicate exists. If so, processing continues to block 512, otherwise, processing continues to block 520. In block 512, the query optimization system 132 attempts to select a target column from the list of candidate target columns. In particular, during this target column identification process, from the list of candidate target columns, one of the target columns is selected based on various factors (such as index predicate selectivity, etc.). In certain implementations of the invention, the target column is selected if a new index access path may be introduced into a query operation by adding a predicate on the target column or if the added predicate may improve the selectivity estimation of the query operation.

In block 514, the query optimization system 132 determines whether a target column has been selected. If so, processing continues to block 516, otherwise, processing continues to block 520. In block 516, the query optimization system 132 generates a bounds subquery. In this predicate introduction process, a bounds subquery is generated so that a new predicate may be added to the received query. With source predicate information and range binding information collected for the chosen target column, a bounds view is generated that computes the lower bound and upper bound for the new range predicate.

To illustrate the process, sample statement (10) will be discussed again. First, qualified outliers are selected from a corresponding outlier MQT (e.g. those with O_ORDERDATE between ('1997-07-01') and date ('1997-07-01')+3 month). The distance between a source column and a target column is computed (e.g. L_SHIPDATE–O_ORDERDATE). An additional filtering predicate may be included to select those records that have non-null values in the interesting columns if the outlier MQT is defined with an outer join. The distance for this additional filtering predicate is considered as another bump of distance distribution between source and target column, with width 0 (e.g. lower bound is equal to upper bound). The predicates are UNIONed with the declared bumps (e.g. (0, 124)) of the algebraic rule. Then, the width of each bump is extended by the width of the source range (e.g. DAYS(date('1997-07-01')+3 month)–DAYS(date('1997-07-01'))). The calculation of the width may be performed by plugging the upper bound and lower bound of the source range into the range binding expression. All the bumps are then ordered by their starting points (i.e., lower bounds), and the overlapping bumps are subsequently merged so that there is no need to use an OR expression for overlapping ranges and to avoid introducing duplicate records into the query. The generated bounds view or bounds subquery has the following output columns, lb for lower bound, up for upper bound, and rownumber if the target column is nullable. With knowledge of the number of bumps and the statistics of the number of rows in the outlier MQT, it is possible to get better selectivity estimates that indicate the resulting cardinalities after applying the newly introduced predicates. These may be used to influence the data store engine 132 when attempting to select an optimal access plan.

In block 518, the query optimization system 132 merges the bounds subquery with the received query and a new predicate is generated. In particular, after the bounds subquery for calculating new ranges is generated, the bounds subquery is merged into the main query and a new range predicate is added to this merged query.

Depending on where the target column occurs in the range binding expression (e.g. the subtraction expression), the new range predicate may be derived slightly differently. If the target column is on the left hand side of the range expression (e.g., the binding expression is target_expression–source_expression), then the new predicate is of form: target_column between "lower bound of source range+lb" and "lower bound of source range"+ub. If the target column is on the right hand side of the expression (e.g., the binding expression is source_expression–target_expression), then the new predicate is of form: target_column between "upper bound of source range–ub" and "upper bound of source range"–lb. In sample statement (10), the binding expression is L_SHIPDATE–O_ORDERDATE, and the target column L_SHIPDATE occurs on the left hand side of the binding expression, so the new predicate is "L_SHIPDATE between date('1997-07-01')+lb days and date('1997-07-01')+ub days". If the target column is nullable, the form of introduced predicate is changed accordingly.

In block 520, the data store engine 130 optimizes the received query and selects a plan.

In certain implementations of the invention, a modification is made to processing of blocks 504 and 508 of FIGS. 5A and 5B to handle correlations. When dealing with correlation, a range predicate may be derived with queries that contain correlation. Sample statement (12) illustrates a query with a correlation. In particular, sample statement (12) contains an EXISTS subquery with correlation. In certain implementations of the invention a query compiler in the data store engine 130 may be able to convert the EXISTS subquery into a join, thus removing the correlation. For this illustration, it is assumed that this transformation does not happen, so the subquery stays as it is in the original query. The correlation predicate L_ORDERKEY=O_ORDERKEY looks like a match to the join predicate L_ORDERKEY=O_ORDERKEY in the outlier MQT defined in statement (5). The parent (O_ORDERKEY) and child (L_ORDERKEY) of correlation in statement (12) belong to different query blocks, thus the matching technique (block 504 of FIG. 5A) would not match the correlation to the join predicate.

```
    SELECT O_ORDERPRIORITY, COUNT(*)        Statement (12)
        AS ORDER_COUNT
    FROM ORDERS
    WHERE O_ORDERDATE >= DATE ('1997-11-01') AND
    O_ORDERDATE <
    DATE ('1997-11-01') + 3 MONTH
        AND EXISTS (
        SELECT *
        FROM LINEITEM
        WHERE L_ORDERKEY = O_ORDERKEY AND
        L_COMMITDATE < L_RECEIPTDATE)
        GROUP BY O_ORDERPRIORITY
        ORDER BY O_ORDERPRIORITY;
```

To solve this problem, in certain implementations of the invention, a modification is made to processing of blocks 504 and 508 of FIGS. 5A and 5B to handle correlations. As described in U.S. patent application Ser. No. 09/502,821, incorporated by reference above, during the process of matching a derived box in a query to a box in an outlier MQT, a mapping is built between the quantifiers of the query box and those in the outlier MQT box. This mapping is then used to translate a correlation predicate in the context of the query into a predicate in the context of the outlier MQT for matching. Now, during the process of comparing a query box with the correlation to the outlier MQT box, the parent quantifier of the correlation predicate may be added into the quantifier map of the current query box. This enables establishing a mapping between the parent quantifier of the correlation predicate and a quantifier in an outlier MQT.

The correlation predicate may then be translated into a join predicate in the context of the outlier MQT for comparison. If the translated join predicate matches the join predicate in the outlier MQT, a new predicate may be derived in the child box ("child query block") of the correlation using the source predicate on the quantifier of the parent box for more efficient searching. Additionally, the processing of block 508 is modified to search the parent box ("parent query block") of the correlation predicate for the source predicate.

In the example in sample statement (12), when the select box in the subquery QGM representation (e.g., SELECT*FROM LINEITEM) is compared to a box in the outlier MQT QGM representation, the parent quantifier of the correlation (e.g., SELECT . . . FROM ORDERS) is added to the quantifier map. Thus, the correlation predicate L_ORDERKEY=O_ORDERKEY is matched to the join predicate (L_ORDERKEY=O_ORDERKEY) in the outlier MQT defined in sample statement (5). The predicates in the parent block are searched and the predicates O_ORDERDATE>=date ('1997-11-01') and O_ORDERDATE<date ('1997-11-01')+3 month are selected as source predicates. A newly derived predicate is added to the subquery as shown in sample statement (13). In particular, sample statement (13) illustrates a correlated subquery optimized using a range multiplying technique.

```
WITH DPAT (DLB, DUB) AS                          Statement (13)
(
  VALUES (0, 124)
  UNION ALL
  (
    SELECT
      OUTLIER_DISTANCE AS LB, OUTLIER_DISTANCE AS UB
    FROM
      (SELECT DISTINCT L_SHIPDATE - O_ORDERDATE AS
  OUTLIER_DISTANCE
       FROM AUTO.ARAMAST1
       WHERE NOT (L_SHIPDATE- O_ORDERDATE BETWEEN
       0 AND 124)
         AND O_ORDERDATE >= DATE ('1997-07-01') AND
  O_ORDERDATE < DATE ('1997-07-01') + 3 MONTH
       ) AS Q
  )
),
QUERYRANGE AS
  (SELECT ROWNUMBER() OVER (ORDER BY DLB)
  AS
  SEQUENCE,
       DLB, DUB, DUB +
         DAYS(DATE('1997-07-01') + 3 MONTH) -
  DAYS(DATE('1997-07-01')) AS AUB
    FROM DPAT
  ),
MERGEDQUERYRANGE0 (SEQUENCE, DLB, AUB,
INHERITED) AS
( SELECT SEQUENCE, DLB, AUB, 0 AS INHERITED
    FROM QUERYRANGE
    WHERE SEQUENCE = 1
  UNION ALL
  (SELECT SEQUENCE, CASE INHERITED WHEN 0 THEN
    DT_DLB ELSE
  MQR0_DLB END AS DLB, DT_AUB, INHERITED
    FROM
      (SELECT DT.SEQUENCE, CASE WHEN MQR0.AUB <=
      DT.DLB
  THEN 0 ELSE 1 END AS INHERITED,
         MQR0.DLB AS MQR0_DLB, MQR0.AUB AS
  MQR0_AUB, DT.DLB AS DT_DLB, DT.AUB AS DT_AUB
       FROM MERGEDQUERYRANGE0 MQR0, QUERYRANGE
       AS DT
       WHERE MQR0.SEQUENCE +1 = DT.SEQUENCE
      ) AS Q
  )
),
MERGEDQUERYRANGE AS
  (SELECT DLB AS LB, AUB AS UB,
    CASE WHEN MAX(INHERITED) OVER (ORDER BY DLB ROWS
  BETWEEN 1 FOLLOWING AND 1 FOLLOWING) =1
      THEN 0 ELSE 1 END AS SURVIVE,
    INHERITED
```

-continued

```
FROM MERGEDQUERYRANGE0
),
BOUNDS AS
  (SELECT *
  FROM MERGEDQUERYRANGE
  WHERE SURVIVE = 1
  )
SELECT O_ORDERPRIORITY, COUNT(*) AS ORDER_COUNT
FROM ORDERS
WHERE O_ORDERDATE >= DATE ('1997-07-01') AND
O_ORDERDATE < DATE ('1997-07-01') + 3 MONTH
  AND EXISTS
    (SELECT *
    FROM LINEITEM, BOUNDS
      WHERE L_ORDERKEY = O_ORDERKEY AND
L_COMMITDATE < L_RECEIPTDATE
      AND L_SHIPDATE BETWEEN DATE('1997-07-01') +
      LB DAYS
          AND DATE('1997-07-01') + UB DAYS
  )
GROUP BY O_ORDERPRIORITY ORDER BY O_ORDERPRIORITY;
```

Thus, implementations of the invention provide a technique for representing algebraic rules using outlier MQTs and using the outlier MQTs for optimizing queries. In particular, new range predicates are inferred from given algebraic rules and range predicates in query. These derived new predicates offer more efficient access paths to data and reduce the search domain, thereby improving the performance of queries.

Thus, implementations of the invention express a broader set of algebraic rules to a DBMS, allow declaration of relationships between columns of different tables, and handle statistical relationships (e.g., relationship between ship date and order date has statistical significance and a probability is associated with the relationship). Additionally, the algebraic rules are not imposed by the DBMS as hard constraints over the data.

Additional Implementation Details

The described techniques for query optimization with algebraic rules may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2, 3, 5A, and 5B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2, 3, 5A, and 5B may be implemented in software, hardware, programmable and non-programmable gate array logic or in some combination of hardware, software, or gate array logic.

Figure 6:
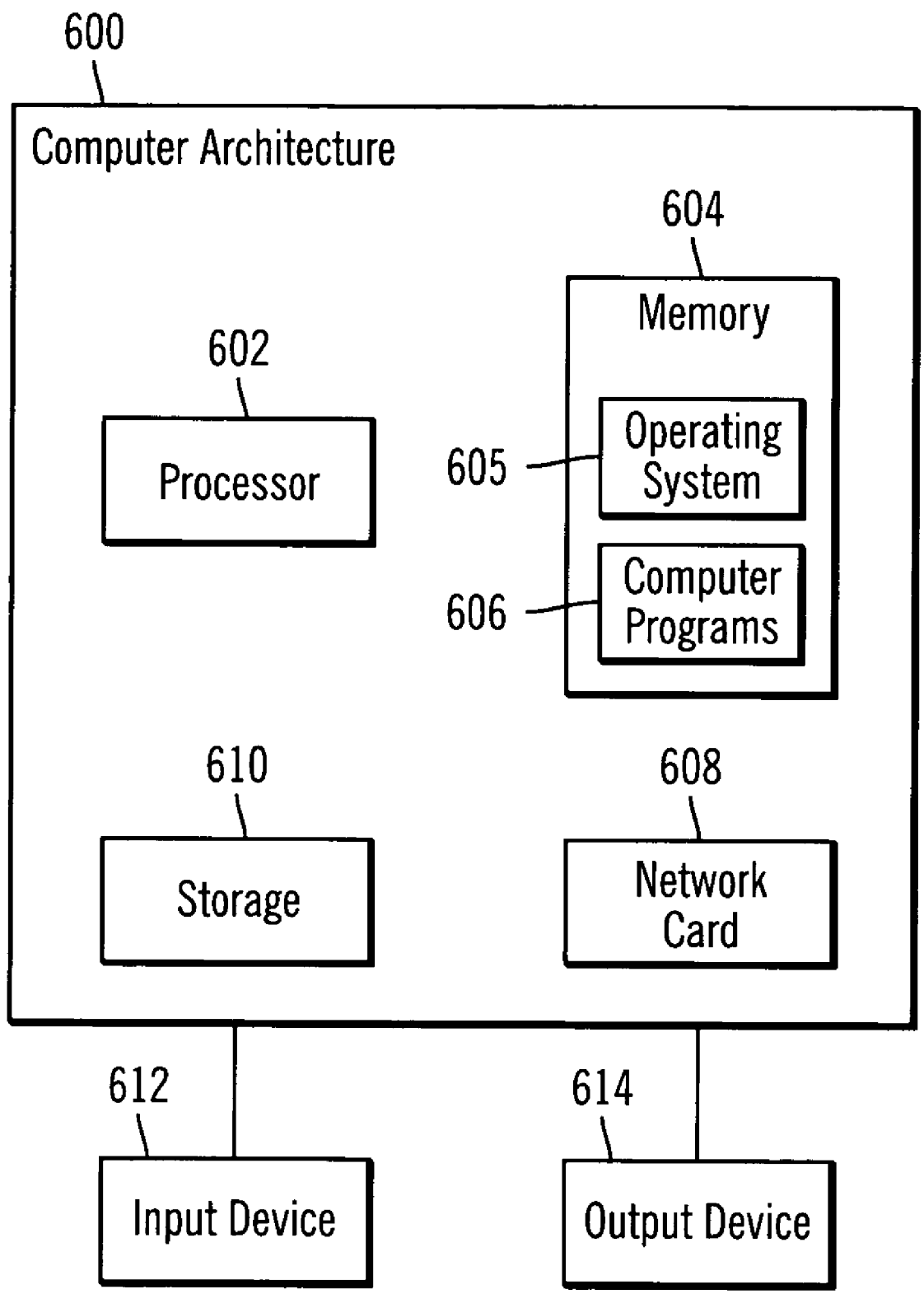
FIG. 6 illustrates an architecture of a computer system that may be used in accordance with certain implementations of the invention.

FIG. 6 illustrates an architecture of a computer system that may be used in accordance with certain implementations of the invention. Client computer 100 and/or server computer 120 may implement computer architecture 600. The computer architecture 600 may implement a processor 602 (e.g., a microprocessor), a memory 604 (e.g., a volatile memory device), and storage 610 (e.g., a non-volatile storage area, such as magnetic disk drives, optical disk drives, a tape drive, etc.). An operating system 605 may execute in memory 604. The storage 610 may comprise an internal storage device or an attached or network accessible storage. Computer programs 606 in storage 610 may be loaded into the memory 604 and executed by the processor 602 in a manner known in the art. The architecture further includes a network card 608 to enable communication with a network.

An input device 612 is used to provide user input to the processor 602, and may include a keyboard, mouse, pen-stylus, microphone, touch sensitive display screen, or any other activation or input mechanism known in the art. An output device 614 is capable of rendering information from the processor 602, or other component, such as a display monitor, printer, storage, etc. The computer architecture 600 of the computer systems may include fewer components than illustrated, additional components not illustrated herein, or some combination of the components illustrated and additional components.

The computer architecture 600 may comprise any computing device known in the art, such as a mainframe, server, personal computer, workstation, laptop, handheld computer, telephony device, network appliance, virtualization device, storage controller, etc. Any processor 602 and operating system 605 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention may be made without departing from the spirit and scope of the invention, the invention resides in the claims hereinafter appended.

What is claimed is:

1. A method for executing a query, comprising:

matching the query to an outlier materialized query table that stores exception data, wherein the query contains a correlation predicate, by translating the correlation predicate into a join predicate in a context of the outlier materialized query table and, when the translated join predicate matches the join predicate in the outlier materialized query table, deriving a new predicate for the correlation predicate in a child query block using a source predicate on a quantifier of a parent query block;

searching the query for a source predicate, including searching the parent query block for the source predicate;

searching an outlier predicate in the outlier materialized query table that corresponds to the source predicate for a target column that corresponds to a source column in the source predicate;

deriving a new range predicate based on the target column; and introducing the new range predicate into the query, wherein the query is executed to retrieve data from one or more data stores.

2. The method of claim 1, further comprising:
merging the new range predicate into the query.

3. The method of claim 1, further comprising:
generating a bounds view from source predicate information and range binding information collected for the target column, wherein the bounds view computes a lower bound and an upper bound for the new range predicate, and wherein the bounds view is capable of being generated using at least one of a range multiplying technique or a range stretching technique.

4. The method of claim 1, wherein matching the query to an outlier materialized query table further comprises:
creating a first query graph model representation of the query;
creating a second query graph model representation of the outlier materialized query table; and
comparing the first query graph model and the second query graph model.

5. The method of claim 1, wherein there is a join in the outlier materialized query table and wherein matching further comprises:
determining that join predicates other than the outlier predicate in the outlier materialized query table have matching predicates in the query.

6. The method of claim 5, wherein the new range predicate is derived by selecting the target column from base tables involved in the join.

7. The method of claim 6, wherein the target column is from a table other than the one in which the source column resides.

8. The method of claim 6, wherein the target column is from a same table as the one in which the source column resides.

9. An article of manufacture comprising one of hardware logic and a computer readable storage medium including a program for executing a query, wherein the hardware logic or program causes operations to be performed, the operations comprising:
matching the query to an outlier materialized query table that stores exception data, wherein the query contains a correlation predicate, by translating the correlation predicate into a join predicate in a context of the outlier materialized query table and, when the translated join predicate matches the join predicate in the outlier materialized query table, deriving a new predicate for the correlation predicate in a child query block using a source predicate on a quantifier of a parent query block;

searching the query for a source predicate, including searching the parent query block for the source predicate;

searching an outlier predicate in the outlier materialized query table that corresponds to the source predicate for a target column that corresponds to a source column in the source predicate;

deriving a new range predicate based on the target column; and introducing the new range predicate into the query, wherein the query is executed to retrieve data from one or more data stores.

10. The article of manufacture of claim 9, wherein the operations further comprise:
merging the new range predicate into the query.

11. The article of manufacture of claim 9, wherein the operations further comprise:
generating a bounds view from source predicate information and range binding information collected for the target column, wherein the bounds view computes a lower bound and an upper bound for the new range predicate, and wherein the bounds view is capable of being generated using at least one of a range multiplying technique or a range stretching technique.

12. The article of manufacture of claim 9, wherein the operations for matching the query to an outlier materialized query table further comprise:
creating a first query graph model representation of the query;
creating a second query graph model representation of the outlier materialized query table; and
comparing the first query graph model and the second query graph model.

13. The article of manufacture of claim 9, wherein there is a join in the outlier materialized query table and wherein the operations for matching further comprise determining that join predicates other than the outlier predicate in the outlier materialized query table have matching predicates in the query.

14. The article of manufacture of claim 13, wherein the new range predicate is derived by selecting the target column from base tables involved in the join.

15. The article of manufacture of claim 14, wherein the target column is from a table other than a table in which the source column resides.

16. The article of manufacture of claim 14, wherein the target column is from a same table as the one in which the source column resides.

17. A system for executing a query, comprising:
a processor;
means for matching the query to an outlier materialized query table that stores exception data, wherein the query contains a correlation predicate, by translating the correlation predicate into a join predicate in a context of the outlier materialized query table and, when the translated join predicate matches the join predicate in the outlier materialized query table, deriving a new predicate for the correlation predicate in a child query block using a source predicate on a quantifier of a parent query block;

means for searching the query for a source predicate, including searching the parent query block for the source predicate;
means for searching an outlier predicate in the outlier materialized query table that corresponds to the source predicate for a target column that corresponds to a source column in the source predicate;

means for deriving a new range predicate based on the target column; and
means for introducing the new range predicate into the query, wherein the query is executed to retrieve data from one or more data stores.

* * * * *